(12) United States Patent
Holmes (10) Patent No.: US 8,833,717 B1
(45) Date of Patent: Sep. 16, 2014

(54) HANGER DEVICE AND TOTE

(76) Inventor: George David Holmes, Hendersonville, TN (US)

(*) Notice: Subject to any disclaimer, the term of this patent is extended or adjusted under 35 U.S.C. 154(b) by 253 days.

(21) Appl. No.: 12/639,866

(22) Filed: Dec. 16, 2009

Related U.S. Application Data (60) Provisional application No. 61/138,023, filed on Dec. 16, 2008.

(51) Int. Cl.
*A47H 1/10* (2006.01)

(52) U.S. Cl.
USPC ........... 248/328; 248/317; 248/690; 248/110; 211/113; 211/66; 15/1.7

(58) Field of Classification Search
USPC ......... 248/317, 328, 690, 327, 110, 111, 113; 403/349; 220/755, 756; 224/200; 211/113, 66; 15/1.7
See application file for complete search history.

(56) References Cited

U.S. PATENT DOCUMENTS

| | | | | |
|---|---|---|---|---|
| 831,391 | A * | 9/1906 | Ubellar | 248/690 |
| 1,172,937 | A | 2/1916 | Butcher | |
| 1,803,569 | A * | 5/1931 | Taylor | 248/113 |
| 2,940,102 | A * | 6/1960 | Marinus | 401/6 |
| 3,407,424 | A * | 10/1968 | Lanzarone et al. | 15/145 |
| 3,709,373 | A | 1/1973 | Aguilar | |
| 3,945,736 | A * | 3/1976 | Rittenbaum et al. | 401/289 |
| 4,023,712 | A * | 5/1977 | Babiak et al. | 222/175 |
| 4,259,857 | A * | 4/1981 | Fontana | 70/456 B |
| 5,379,928 | A * | 1/1995 | Mikkelsen | 224/257 |
| 5,601,197 | A | 2/1997 | Baxter | |
| 5,722,125 | A * | 3/1998 | Vasilopoulos | 24/301 |
| 5,926,891 | A * | 7/1999 | Velasquez et al. | 15/1.7 |
| 5,974,845 | A * | 11/1999 | Wang et al. | 70/456 R |
| 6,010,105 | A * | 1/2000 | Davis | 248/317 |
| D481,610 | S * | 11/2003 | Neumann et al. | D8/107 |
| 6,854,919 | B2 * | 2/2005 | Neumann et al. | 403/326 |
| 6,925,686 | B2 * | 8/2005 | Heathcock et al. | 16/429 |
| 7,040,517 | B1 | 5/2006 | Swanson | |
| 7,563,047 | B2 * | 7/2009 | Paluda | 401/131 |
| 2005/0251940 | A1 * | 11/2005 | Black | 15/144.1 |
| 2006/0016047 | A1 * | 1/2006 | Blackman et al. | 16/231 |
| 2011/0239376 | A1 * | 10/2011 | Schmidt | 7/167 |

* cited by examiner

*Primary Examiner* — Nkeisha Smith
(74) *Attorney, Agent, or Firm* — Stites & Harbison PLLC; Nicolo Davidson (57) ABSTRACT

An hanger apparatus including one or more extension elements with each extension element including a top portion and a bottom portion with the top portion having at least one flexible connector connection with the top portion also in communication with the bottom portion and the bottom portion including apertures for connecting a pool pole-head attachment, with the apparatus additionally including a flexible connector connecting to the at least one flexible connector connection of the top portion.

2 Claims, 6 Drawing Sheets

HANGER DEVICE AND TOTE

The present application claims the benefit of U.S. provisional patent application Ser. No. 61/138,023, entitled "Hanger Device and Tote" filed Dec. 16, 2008, which is hereby incorporated by reference.

BACKGROUND OF THE INVENTION

1. Technical Field

The present invention relates to organizational and hanger type devices which are uniquely useful for applications including organizing swimming pool pole-head attachments. More particularly, the present invention relates to an organizational device as well as to a portable device exhibiting compact characteristics for organizing swimming pool pole-head attachments. The invention may also be applicable to other head type units including attachments for vacuum cleaners and the like.

2. Background Art

A variety of devices exist useful for keeping articles in an organized fashion. Generally the ownership of a swimming pool in either a residential or commercial setting requires the use of a variety of different cleaning attachments with a cleaning device to adequately clean and maintain a swimming pool. In other applications, a variety of attachments are often needed with cleaning devices or other units for providing a different set of features or characteristics for a system. For organizing a variety of different apparatuses, a variety of different systems and devices have been provided. For example, in U.S. Pat. No. 1,172,937 an article hanger is disclosed which may be used to make horizontal or suspended position. According to the '937 patent the apparatus includes members made of a length of wire bent to form a hook and furthermore are attached to strip so that the hooks project from the strip and are to be used to attach a variety of items.

U.S. Pat. No. 3,709,373 discloses a suspendable support for articles and methods which include an apparatus that has a plurality of individual articles of different shapes and sizes and which may be secured against accidental releases. Additionally, the '373 patent discloses elongated flexible main elements with loops of strong flexible plastic material which may be formed in conventional larks head hitches for encircling and releasably holding articles of different shapes and sizes.

In U.S. Pat. No. 5,601,197 a hanging storage device is disclosed which includes multi-positional clip assemblies. Generally, the '197 patent discloses a plurality of clamps designed to be slidable along a length of rope or other support so that a user can vary the space between each clip assembly. Additionally, the '197 patent discloses that the user may hang items such as hats, ball caps and the like in various selectable displays.

U.S. Pat. No. 6,010,105 discloses a hanging device for suspending implements with appropriate ring sizes to engage Styrofoam float objects. Generally the invention of the '105 patent discloses an upright hanging storage arrangement of the Styrofoam objects.

While the prior art storage devices provide solutions for various problems, there appears to be a lack of equipment effective for many applications of organizing head type attachments. The prior art storage devices generally available are not easily attachable to head type apparatus's and furthermore do not organize them in a compact arrangement for a user. In addition, a variety of storage devices known with the prior art do not provide the portability and ease of use which should be available to a user.

In maintaining swimming pools, a variety of attachments are often necessary ranging from vacuum type attachments to a variety of differently shaped brushes for scrubbing the inside of the pool. Vacuum heads can range in size from a more standard 14 inch styled vacuum head to vinyl specific vacuum heads, to larger 22 inch commercial vacuum heads which are often utilized to clean the large public-styled pools.

Additionally, specific brush heads exist for various application ranging from cleaning the walls of a pool to brushes of a different size for scrubbing the floor of the pool. Often the brush heads range in width from about 36 inches to about 5 inches and thus provide for attributes in cleaning a swimming pool. For example, some brushes may be of a wire design which provide for harsher contact whereas other brushes may include combinations of bristle types or may alternatively include some manner of synthetic bristles. In addition to the various types of brushes that may be used on a pool, one may also need a variety of pool nets or the like. Pool nets can include varieties such as a standard skimmer net or alternatively a leaf rake or other styles of netting including varying degrees of mesh so that differently sized particles may be captured and removed from the pool.

The variety of attachments that are used with a swimming pool may be used with pole for utilization by a consumer. Generally, the pole may be of a substantial length so that the user can work with and utilize the attachments in cleaning or otherwise servicing the pool. In some instances, the pole may be of a telescopic variety, where the pole may be adjustable in size, for example, from about five feet to about fifteen feet. As such, a user would be able to clean the various depths of the swimming pool through the use of the pole and furthermore be able to attach the various attachments to the pole for cleaning. Generally, the pool pole may include an end with a slightly larger diameter than that of the pool pole-head attachments with spring-pressured protrusions for maintaining the attachment on the pole until the protrusions are pressed inward by the user.

Most often, the pool pole-head attachments include an attaching end with about an exterior diameter slightly smaller than the interior diameter of the end of the pole for attaching thereto. The attachment end of the pool pole-head attachments may also include protrusions so that the protrusions on the end of the pool pole head attachment can insert within the apertures on a pool pole head. This maintains the pool pole-head attachments on the end of the pole until the user desires to remove and switch the pool pole-head attachment to another type.

What is desired therefore is an organizational device which is both compact easy to use and includes a combination of quick attachments and easy portability making the device suitable for use in organizing and attaching swimming pool pole-head attachments and the like. Indeed a combination of characteristics including a compact nature as well as quick attachments provide an organizational apparatus with mode for organizing head type attachments, which may optionally include the organization of pool-pole head attachments for use with the swimming pool. In further optional embodiments, the invention may include a type of swivel design that may be useful in aligning the attachments connected to the device so that the attachments may be more advantageously oriented for storage.

BRIEF SUMMARY OF THE INVENTION

The present invention provides an organizational device which is uniquely capable of compactly organizing head type attachments which may be used in cleaning a swimming pool or the like. The inventive apparatus exhibits a quick attachment and ease of use as well as compact design to provide a combination of characteristics not heretofore seen. In addition, the optional embodiments of the device with connected head-type attachments can organize the head-type attachments in a similar direction in a compact arrangement while providing a user friendly and easy method of carrying the device.

More particularly, an optional embodiment of the hanger apparatus includes rotational elements so that the head type devices may be rotated to lie in a generally flat arrangement. An additional characteristic of optional embodiments of the device may include that the rotatable elements of the apparatus are in generally close proximity and can align the head type devices in a more compact fashion so long as the head attachments are combined with the apparatus in practice of the present invention.

As used herein, the term "head attachments" may include pool-pole head attachments, or vacuum head type attachments or any other type of attachments that share a common connection for use with another device which may include a pole or the like. Further as used herein, the term "engage" means to interact with, interlock with, associate with or communicate with.

Optional embodiments of the invention may also comprise an attachment which may comprise a quick release attachment for attaching head type apparatuses thereto. The quick release attachment may comprise one or more apertures within the rotatable extension of the apparatus in which the head may fit similarly to how the head may fit on the specific cleaning device.

The organizational apparatus in optional embodiments may also include a flexible connection which may comprise rope, cord, chain, bands or other flexible materials so that a user may easily grab and hang the apparatus with the heads attached. Generally speaking, the use of a flexible attachment in optional embodiments which may include cord, rope or other material, provides the user with the capacity for the apparatus to be hung or carried.

An object of an optional embodiment of the apparatus therefore is an organizational apparatus having characteristics which enable it to be employed for organizing swimming pool pole-head attachments.

Another object of an optional embodiment of the apparatus is an organizational apparatus having a rotatable characteristic so that the invention organizes swimming pool pole-head attachments in an organized style.

Another object of an optional embodiment of the apparatus is an organizational apparatus having a non-rotatable characteristic with a flexible element so that the invention organizes swimming pool pole-head attachments in an organized style.

Still another object of an optional embodiment of the apparatus is an organizational apparatus having a flexible element for hanging or carrying the apparatus with ease.

Yet another object of an optional embodiment of the apparatus includes apertures for connecting the head attachments to the device for maintenance of the pool pole head attachments in a generally compact arrangement.

These aspects and others that would become apparent to the artisan upon review of the following description can be accomplished by providing an optional embodiment of an organizational device formed with an optional rotatable element having at least one aperture so that the head attachments are attachable and lay in an organized fashion when hung on a wall. The inventive organizational apparatus advantageously includes a flexible portion so that the invention may be hung while incorporating flex while providing the user the capacity to carry the device to and from the location where the head attachments may be utilized.

It is to be understood that both the foregoing general description and the following detailed description provide embodiments of the invention and are intended to provide an overview or framework of understanding of the nature and character of the invention as it is claimed.

BRIEF DESCRIPTION OF THE DRAWINGS

The accompanying drawings are incorporated in and constitute a part of this specification. The drawings illustrate optional embodiments of the invention and together with the description, serve to explain some principles of the invention.

Reference will now be made in detail to optional embodiments of the invention, examples of which are illustrated in accompanying drawings. Whenever possible, the same reference numbers are used in the drawings and the description refer to the same or like parts.

DETAILED DESCRIPTION OF THE PREFERRED EMBODIMENTS

The invention as described in FIGS. 1-8 includes a hanger apparatus 10 with one or more extension elements 12 and flexible connector 14. Extension elements 12 may include connection points 16 which may comprise apertures for the connection to flexible connector 14 so that one may be able to hang the invention. Otherwise stated, extension elements 12 include, in various optional embodiments, connection points 16 which may include holes or apertures but may further include studs, knobs, fittings or other protrusions for attaching to flexible connector 14. In an optional embodiment, connection points 16 comprise holes so that flexible connector 14 may run through the holes and in optional embodiments may be of an extension of cord or the like so that hanger apparatus 10 may be hung.

In optional embodiments, an extension element 12 may include a round exterior and may be formed of a variety of different materials including plastics, polymers, metals and the like. Optional embodiments include a rotatable extension element 12 which may exhibit some rotation. As used herein, rotational fit refers to the capacity or characteristic to rotate. Extension element 12 may include top portion 18 and bottom portion 20 wherein bottom portion 20 may rotate relative to top portion 18. In such optional embodiments, top portion 18 may include retention element 22 and bottom portion 20 may include shoulder 24 for maintaining bottom portion 20 in connection with top portion 18. Retention element 22 may include a ring-type design that may partially or completely span the entire inner circumference of top portion 18 at about distal end 26. In further optional embodiments, retention element 22 may be placed at various other locations within top portion 18, though it is positioned somewhere between connection points 16 and distal end 26. In further optional embodiments retention element 22 may includes a small ring positioned within top portion 18 of hanger apparatus 10 where retention element 22 may be secured by glue, polymer, fixtures or alternatively molded into top portion 18. Other optional embodiments may include design configurations of top portion 18 so that an area with a smaller diameter exists which is located near the distal end 26.

Bottom element 20 includes shoulder 24 and also one or more attachment apertures 28. Generally, bottom element 20 includes a first end 30 with shoulder 24 secured about the exterior in the vicinity of first end 30, and near second end 32 one or more attachment apertures 28 are located for the attachment of head-type apparatuses to hanger apparatus 10.

Shoulder 24 of bottom portion 20 provides an area with a larger diameter so that when joined with the top portion 18, shoulder 24 of bottom portion 20 rests against retention element 22 of top portion 18 to maintain the integrity of the individual extension element 12. As such, top portion 18 and bottom portion 20 are connected primarily through contact of retention element 22 against shoulder 24 and as such, bottom portion 20 in optional embodiments may be able to rotate within top portion 18. Stated differently, retention element 22 of top portion 18 contacts shoulder 24 of bottom portion 20 and allows rotation of bottom portion 20 as top portion 18 and bottom portion 20 are optionally not in a set configuration with respect to each other.

Figure 1:
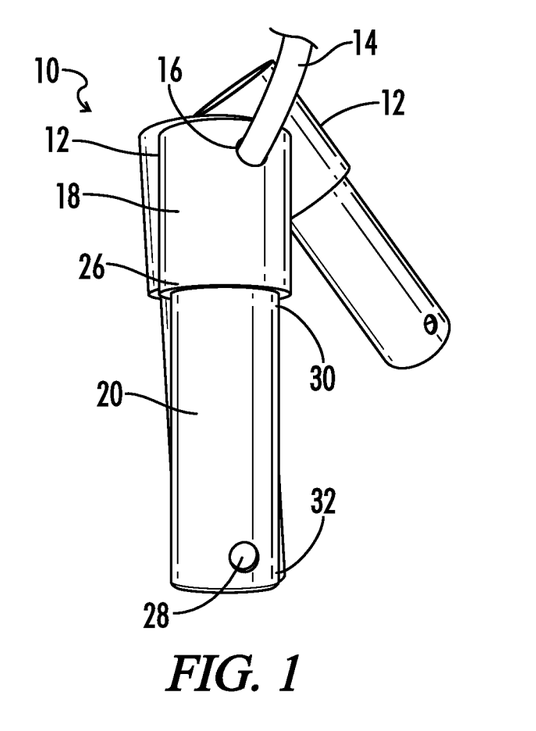
FIG. 1 is an illustration of an optional embodiment of the hanger
Figure 2:
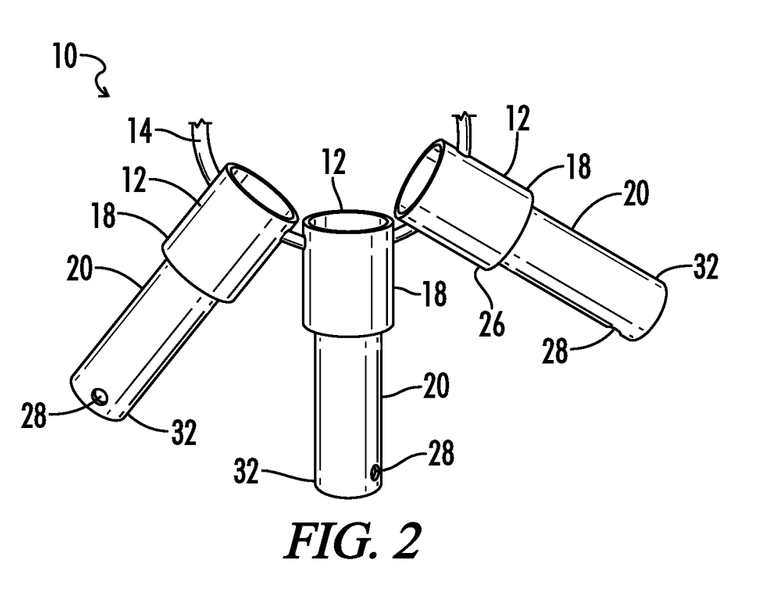
FIG. 2 is an illustration of an optional embodiment of the hanger
Figure 3:
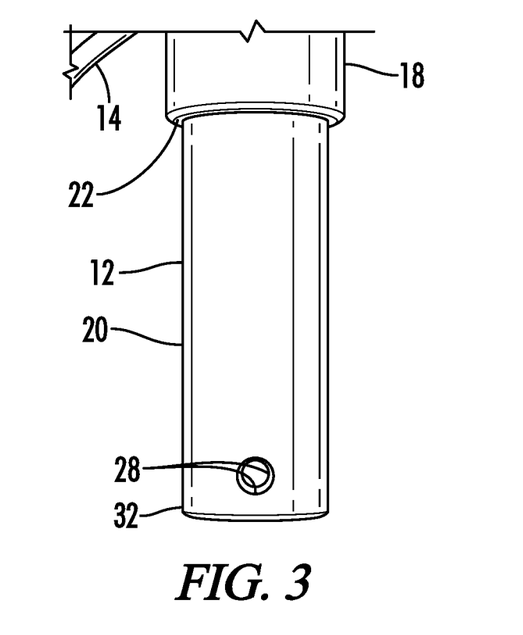
FIG. 3 is an illustration of an optional embodiment of an extension element of the hanger apparatus.
Figure 4:
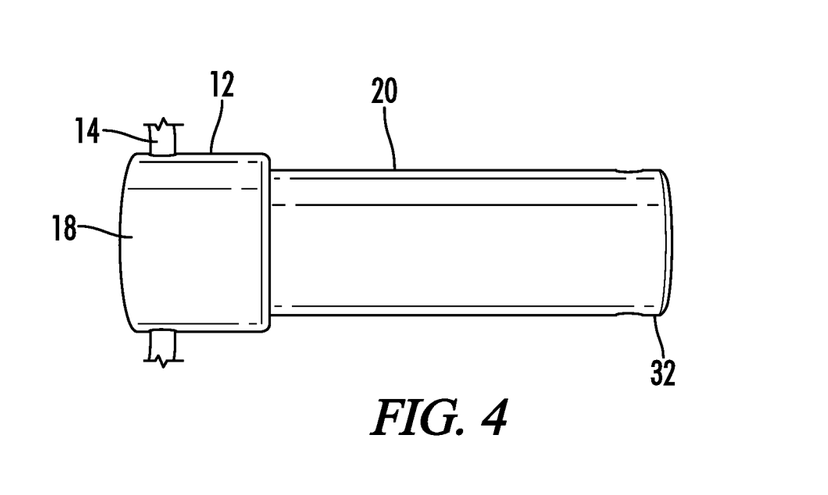
FIG. 4 is an illustration of an optional embodiment of the attachment end of an extension element of the hanger apparatus.
Figure 5:
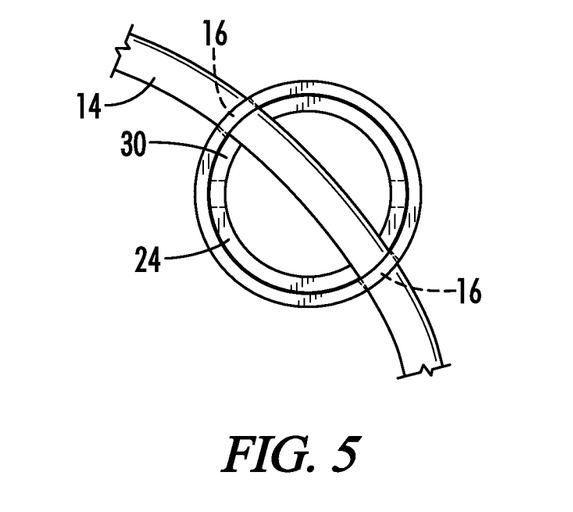
FIG. 5 is a top View illustration of an optional embodiment of an extension element of the hanger apparatus.
Figure 6:
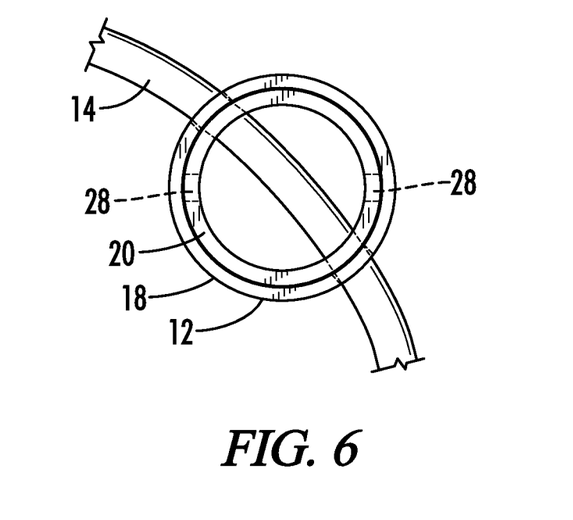
FIG. 6 is a bottom view illustration of an optional embodiment of an extension element of the hanger apparatus.
Figure 7:
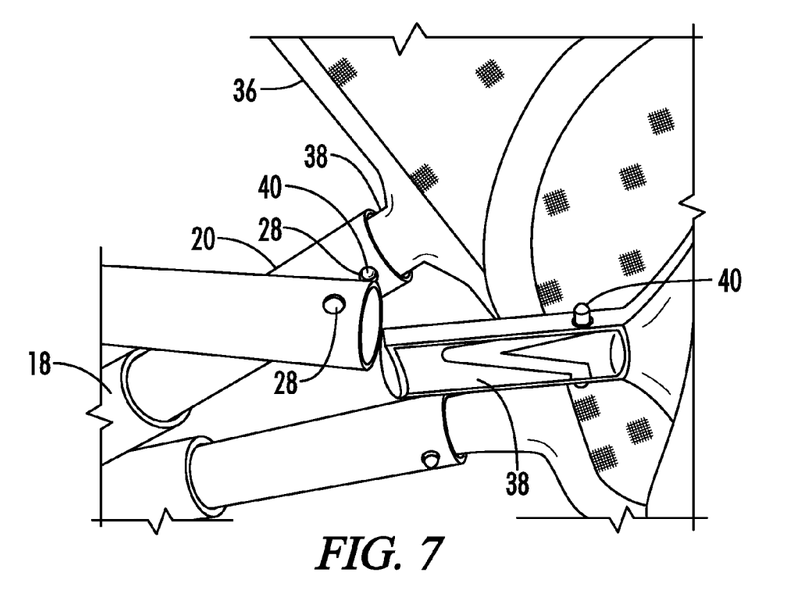
FIG. 7 is an illustration of an optional embodiment of the hanger apparatus with attached and unattached pool-pole head attachments.

Bottom portion 20 of the extensions also include at least one attachment aperture 28 for attaching various implements thereto, including pool-pole head attachments. In various optional embodiments, attachment apertures 28 may include round openings, oval openings, square openings or any other shape that may function so as to maintain an attachment. Generally, the one or more apertures 28 include round holes so that swimming pool pole head attachments may quickly connect to the hanger apparatus. Referring now to FIG. 7 there are pool pole-head attachments 36 with attachments 38 having protrusions 40. As is illustrated in the figure, attachment 38 of a pool pole-head attachment 36 can be inserted into bottom portion 20 of hanger apparatus 10 with protrusions 40 extending out of attachment apertures 28 of bottom portion 20. To insert and maintain a pool pole-head attachment within the bottom portion 20 of the invention, the attachment 38 is inserted and protrusions 40 are depressed so that they slide within the interior of bottom portion 20. Protrusions 40 extend out of apertures 28 once they are properly positioned, and pool pole-head attachment 36 is thus maintained in place. To remove pool pole-head attachments 36, one simply pushes protrusions 40 inward so that attachment 38 with protrusions 40 can be pulled out of bottom portion 20 of extension element 12 of hanger apparatus 10. In further embodiments, other types of attachments in addition to or instead of apertures and corresponding protrusions may be utilized which includes clips, snaps, magnets, Velcro, or other attachments so that a pool pole-head attachment may connect to the apparatus. Additionally, in yet further optional embodiments, apertures 28 of bottom portion 20 may be substantially similar to the connection between the pool pole-head attachment and the cleaning device to which the pool pole-head attachment attaches.

Figure 8:
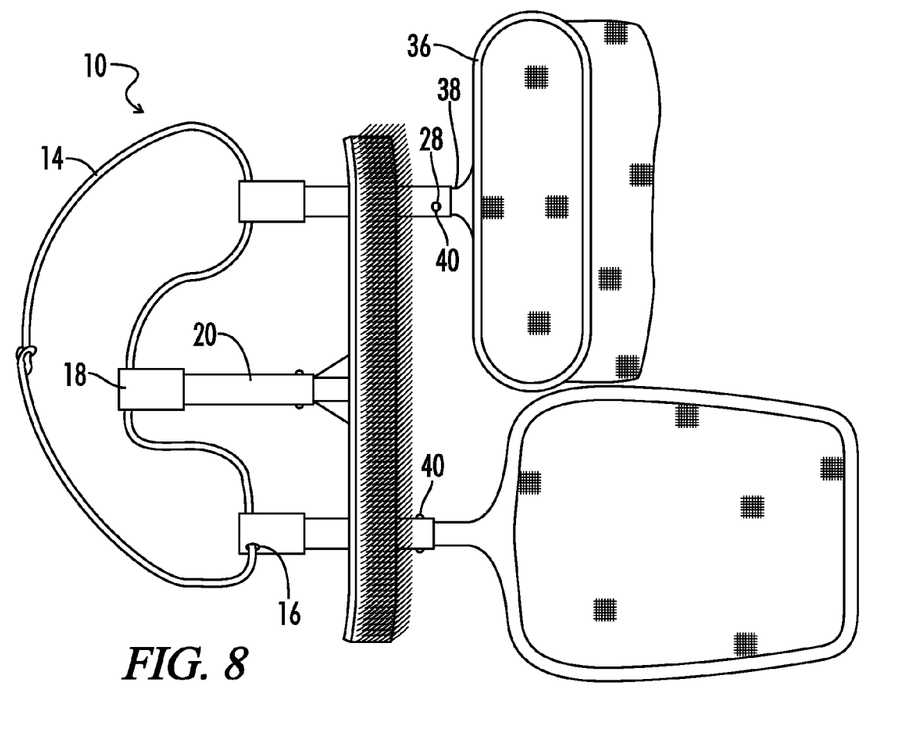
FIG. 8 is an illustration of an optional embodiment of the hanger apparatus with attached pool-pole head attachments.
Figure 9:
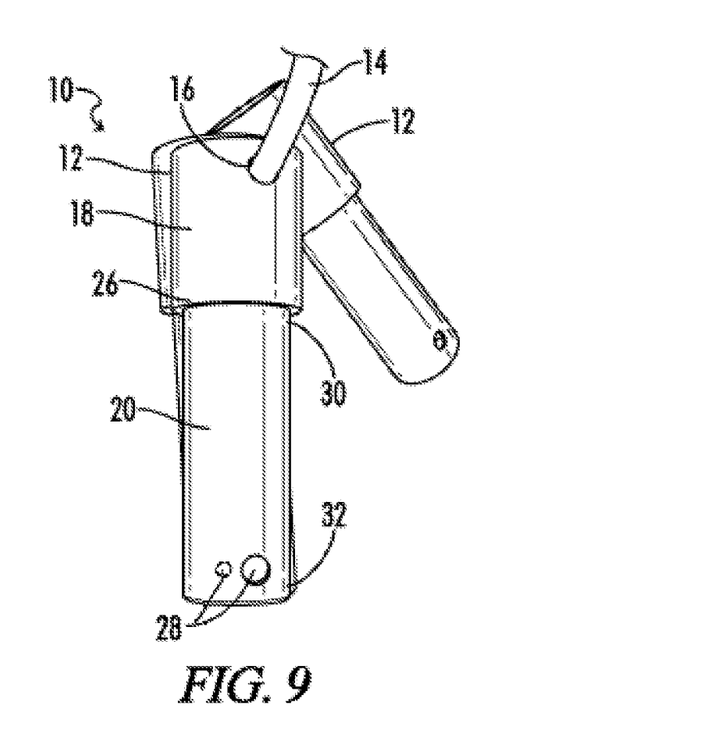
FIG. 9 is an illustration of an optional embodiment of the hanger.
Figure 10:
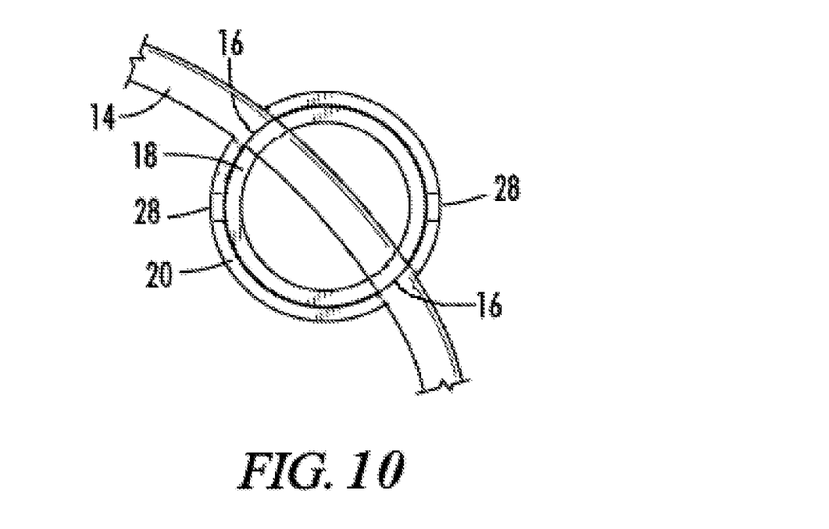
FIG. 10 is a top view illustration of an optional embodiment of an extension element of the hanger apparatus.
Figure 11:
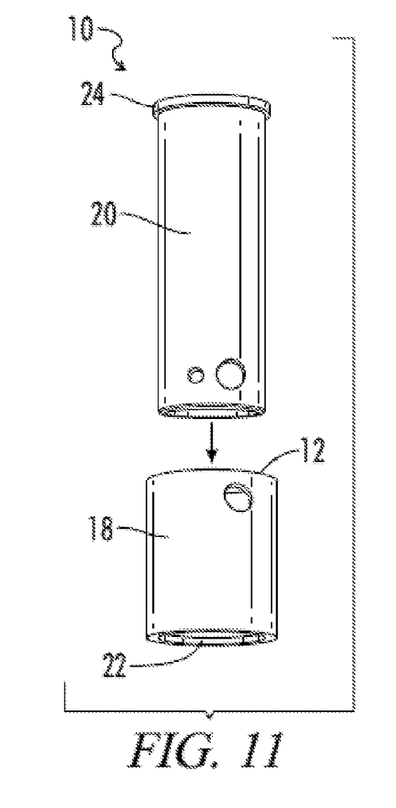
FIG. 11 is an illustration of an optional embodiments of a disassembled extension element of the hanger apparatus.
Figure 12:
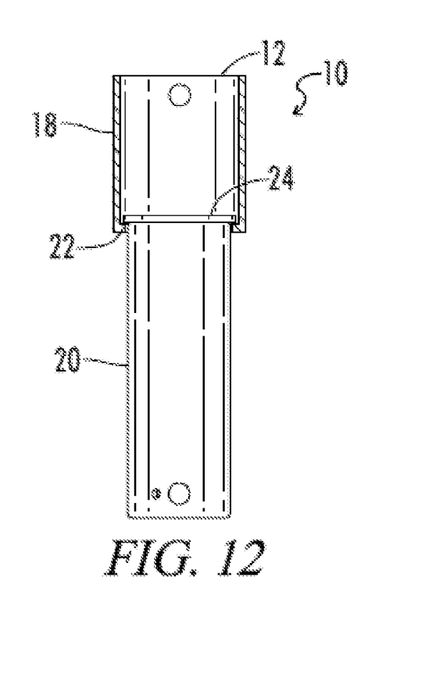
FIG. 12 is a cross-sectional illustration of an optional embodiments of an extension element of the hanger apparatus.

Bottom portion 20 may swivel, or rotate, within top portion 18 of hanger apparatus 10. In optional embodiments, multiple extension elements 12 are included and thus allow for the multiple attachments of pool-pole head attachments 36 thereto. The rotation characteristic of the combination of the top portion and the bottom portion provides for a relatively compact design as each bottom portion may rotate with an attached pool pole-head attachment and can lay in generally parallel planes with other pool pole-head attachment(s) connected to other extensions as illustrated in FIG. 8. Furthermore, when carried, hung, or otherwise maintained the rotation allows an improved arrangement as the bottom portion of each extension rotates to a generally more aligned position with the head type apparatuses attached and generally oriented with the longer side of one pool pole-head attachment generally in alignment with the longer side of the adjacent pool pole-head attachment. In additional optional embodiments the flexible connector may be removed and the top portion may be disassembled from the bottom portion.

One may in optional embodiments understand the shoulder and the retention element to approximate rings or generally circular shapes having about the same diameter or at least overlapping contact surfaces so that the bottom portion is maintained in communication with the top portion.

In yet further embodiments the hanger apparatus can be designed to hold a variety of different brands of pool pole-head attachments and as such may include multiple apertures often of different sizes corresponding to the differing brands.

In yet further optional embodiments the orientations of the portions may be switched where the top portion has a smaller outer diameter than the inner diameter of the bottom portion. This would also create a functional device and as such one should understand the above description to include optional embodiments where the outer diameter of the top portion is smaller than the inner diameter of the bottom portion.

In even further optional embodiments, the extensions may comprise one singular portion and not include a rotational or swivel feature. In such optional embodiments the flexible connector may provide enough flex so that the pool pole-head attachments are generally aligned.

The above apparatus may also include a method of use where users use the apparatus to attach to pool pole-head attachments for organization.

In order to further illustrate the principals and operation of the present invention the following example is provided. However, the example should not be taken as limiting in any regard.

EXAMPLE

One embodiment of the invention may include the following:

1. A portion of rope for the flexible connector having the length of about 4' long and about 5/16" in diameter. The rope may be fused at each end to prevent unraveling.

2. Approximately three portions of plastic pipe for the bottom portions of the extension elements each having about 6½" length with an outside diameter of about 1 11/32" and an inside diameter of 1 5/32". Each portion of pipe may be modified so that about the last ½" of length on one end has an outside diameter of about 1 15/32". The end of the pipe opposite to the end with the outside diameter of 1¹⁵⁄₃₂" has two ⁵⁄₁₆" holes drilled equal distance apart with the leading edge of each hole about ¼" from the end of the pipe for creating apertures for connecting the pool pole-head attachments.

3. Three portions of plastic pipe for the top portions of the extension elements each about 2¼" in length with an outside diameter of about 1²¹⁄₃₂" and an inside diameter of 1¹⁶⁄₃₂" are provided. Each piece of said pipe is modified so that about the last ½" of length on one end has an inside diameter of about 1¹²⁄₃₂". The end of said pipe opposite the end with the inside diameter of 1¹²⁄₃₂" has two about ⅜" holes drilled equal distance apart with the leading edge of each hole ½" from the end of the pipe for creating holes for the flexible connector.

4. Combining the portions to make the extension elements where one of the pieces of 6½" in length pipe is inserted small outside diameter first inside of the larger inside diameter end of one of the pieces of the 2¼" in length plastic pipe until the 6½" in length plastic pipe passes beyond the two ⅜" holes drilled in the 2¼" in length plastic pipe. The rope may be then knotted with a temporary knot approximately 2" from the end. The end of the rope opposite said knot may be passed through both holes in the 2¼" in length plastic pipe entering from the outside of the pipe, passing through the center and exiting the pipe on the opposite side. The two pieces of pipe are now loosely joined together and the rope may prevent them from becoming unjoined. The rope may then be pulled through the 2¼" in length plastic pipe until the pipe is positioned in the middle of the rope.

5. The remaining pieces of plastic pipe are likewise inserted and strung on the rope in creating the hanger apparatus of the present invention. The rope may then be pulled through the plastic pieces until they are positioned in the middle of the rope. The two ends of the rope may then be knotted together with whatever type of knot the user chooses. The temporary knot can be untied if desired.

Accordingly, by the practice of the present invention a hanger apparatus having heretofore unrecognized characteristics is disclosed. This hanger apparatus exhibits a compact design as well as a rotational characteristic making the apparatus advantageous for storing and organizing head type attachments for cleaning article including swimming pool pole-head attachments.

Furthermore, sizes of various structural parts and materials used to make the above mentioned part are illustrative and exemplary only, and persons of ordinary skill in the art would recognize that these sizes and materials can be changed as necessary to produce different effects or desired characteristics.

The above description is intended to enable the person skilled in the art to practice the invention. It is not intended to detail all of the possible variations and modifications that become apparent to the skilled worker upon reading this description. It is intended however that all such modifications and variations be included within the scope of the invention and that is defined by the following claims. The claims are intended to cover the indicated elements and steps in any arrangement or sequence that is affective to meet the objectives intended for the invention, unless the context specifically indicates the contrary.

What is claimed is:

1. A method of hanging pool pole-head attachments comprising the steps of:
    providing a hanger apparatus comprising:
        a plurality of extension elements with each extension element including a top portion and a bottom portion, the top portion having at least one flexible connector connection and a retention element for retaining the bottom portion, the bottom portion including one or more apertures on a side surface of the bottom portion for connecting a pool pole-head attachment and a shoulder for contact with the retention element and for retaining the top portion and configured to allow for rotation of the bottom portion relative to the top portion; and
        a flexible connector connecting to the at least one flexible connector connection of the top portion of each of the plurality of extension elements;
    providing two or more pool pole-head attachments each including an attachment end and a protrusion;
    inserting the attachment end of each of the pool pole-head attachments into an open end of each of the bottom portions of the plurality of extension elements;
    aligning the protrusion of each of the pool pole-head attachments so that each protrusion extends into one of the one or more apertures on the bottom portions;
    rotating the attached pool pole-head attachments and allowing the retention element of the top portion and the shoulder of the bottom portion to rotate relative to each other so that the pool pole-head attachments are generally parallel; and
    allowing the flexible connector to flex so that the pool pole-head attachments are generally aligned.

2. The method of claim 1 further comprising:
    carrying or hanging the apparatus with the attached pool pole-head attachments.

* * * * *